US011209031B2

(12) United States Patent
Brindeau et al.

(10) Patent No.: US 11,209,031 B2
(45) Date of Patent: Dec. 28, 2021

(54) SINGLE SHEAR ATTACHMENT DEVICE WITH AN ECCENTRIC AXIS AND AN ECCENTRIC SLEEVE, MECHANICAL ASSEMBLY INCLUDING SUCH A DEVICE AND ASSEMBLING PROCESS

(71) Applicant: AIRBUS SAS, Blagnac (FR)

(72) Inventors: Jean-Mickael Brindeau, Blagnac (FR); André Aquila, Cornebarrieu (FR); Benoit Ruscassie, Blagnac (FR)

(73) Assignee: Airbus SAS, Blagnac (FR)

( * ) Notice: Subject to any disclaimer, the term of this patent is extended or adjusted under 35 U.S.C. 154(b) by 87 days.

(21) Appl. No.: 16/568,717

(22) Filed: Sep. 12, 2019

(65) Prior Publication Data
US 2020/0088223 A1 Mar. 19, 2020

(30) Foreign Application Priority Data
Sep. 13, 2018 (FR) ...................................... 1858209

(51) Int. Cl.
*F16B 5/00* (2006.01)

(52) U.S. Cl.
CPC .................................. *F16B 5/008* (2013.01)

(58) Field of Classification Search
CPC ...... F16B 5/008; F16B 5/0082; F16B 5/0084; F16B 5/0092; F16B 5/0225; F16B 5/025; F16C 11/10; F16C 11/103; Y10T 403/32336; Y10T 403/32361; Y10T 403/32368; Y10T 403/32451;
(Continued)

(56) References Cited

U.S. PATENT DOCUMENTS

| 3,006,443 A | * | 10/1961 | Siler | ........................ F16B 43/00 403/408.1 |
| 3,725,993 A | * | 4/1973 | Siler | ........................ B25B 27/00 29/271 |

(Continued)

FOREIGN PATENT DOCUMENTS

| DE | 197 19 915 | 12/1998 |
| DE | 19719915 A1 * | 12/1998 ............... B64C 1/26 |

(Continued)

OTHER PUBLICATIONS

Search Report for FR1858209 dated May 24, 2019, 2 pages.

*Primary Examiner* — Amber R Anderson
*Assistant Examiner* — Zachary A Hall
(74) *Attorney, Agent, or Firm* — Nixon & Vanderhye P.C.

(57) ABSTRACT

A single shear attachment device with an eccentric axis and an eccentric sleeve, a mechanical assembly including such a device and an assembling process. The attachment device includes an eccentric axis as well as an eccentric sleeve intended to be mounted on the eccentric axis in order to correct, by an appropriate positioning in rotation of the eccentric sleeve on the eccentric axis, the possible clearance between superposed circular holes of mechanical components that have to be linked together by means of the attachment device, the attachment device also includes blocking means configured to be able to block in rotation the eccentric axis and the eccentric sleeve, said attachment device thus allowing to generate a quick and clear attachment, that is able to correct clearances locally.

9 Claims, 4 Drawing Sheets

(58) Field of Classification Search
CPC ......... Y10T 403/32459; Y10T 403/335; Y10T 403/75; Y10T 403/76
See application file for complete search history.

(56) References Cited

U.S. PATENT DOCUMENTS

| | | | | |
|---|---|---|---|---|
| 3,747,168 | A | * | 7/1973 | Snarskis ................ F16B 5/025 411/349 |
| 4,267,896 | A | * | 5/1981 | Hendriksen ........... B60G 9/003 267/66 |
| 4,444,365 | A | | 4/1984 | Heuberger |
| 5,779,260 | A | | 7/1998 | Reilly et al. |
| 6,688,617 | B2 | * | 2/2004 | Chamberlin ............ B60G 7/02 280/86.751 |
| 10,001,158 | B2 | * | 6/2018 | Grether .................. F16B 2/005 |
| 2001/0029838 | A1 | * | 10/2001 | Blenkush ................ F01B 9/02 92/128 |
| 2006/0096770 | A1 | * | 5/2006 | Roberts .................. F16C 11/10 173/217 |
| 2011/0222801 | A1 | * | 9/2011 | Connell ................. F16C 29/02 384/40 |
| 2014/0203145 | A1 | * | 7/2014 | Blanton .................... B64C 1/00 244/131 |
| 2017/0045080 | A1 | | 2/2017 | Grether et al. |
| 2018/0266478 | A1 | * | 9/2018 | Grether .................. F16B 43/00 |
| 2019/0249696 | A1 | * | 8/2019 | Larue .................. F41G 11/003 |

FOREIGN PATENT DOCUMENTS

| | | | | |
|---|---|---|---|---|
| DE | 10 2012 021 102 | | 4/2013 | |
| DE | 202014006758 | U1 * | 9/2014 | ........... E04B 1/4107 |
| EP | 1 672 231 | | 6/2006 | |
| FR | 2796674 | A1 * | 1/2001 | ............. F16B 43/00 |
| KR | 2005031749 | A * | 4/2005 | |
| KR | 20070101209 | A * | 10/2007 | ........... B60N 2/2252 |
| WO | WO-2005052386 | A2 * | 6/2005 | ............ F16B 5/0225 |
| WO | WO-2018113863 | A1 * | 6/2018 | ............ H02K 15/16 |

* cited by examiner

SINGLE SHEAR ATTACHMENT DEVICE WITH AN ECCENTRIC AXIS AND AN ECCENTRIC SLEEVE, MECHANICAL ASSEMBLY INCLUDING SUCH A DEVICE AND ASSEMBLING PROCESS

CROSS-REFERENCE TO RELATED APPLICATION

This applications claims priority to French Application No. 1858209 filed Sep. 13, 2018, the entire contents of which is hereby incorporated by reference.

TECHNICAL FIELD

The present invention relates to a connection device intended to connect together two different mechanical parts.

SUMMARY

A connection device of this kind can be used in any field, in particular but not exclusively the field of aeronautics, requiring an operation of structural assembly between two mechanical parts (or structures) having a certain play.

Although not exclusively, the present invention may relate more particularly to the fixing of mechanical parts on an aircraft, in particular on a transport airplane, and in particular to the fixing of a floor module in the fuselage of an aircraft.

In order to reduce the time required for production of an aircraft, it is envisaged to carry out operations in parallel, in particular by developing modular elements. To that end, modules are prefabricated and pre-assembled before being installed in the structure of the fuselage of the aircraft, this being done late in the production process. This method of assembly may in particular involve one or more floor modules. To that end, each floor module may be equipped with water pipes, electrical cables, ventilation hoses, floor panels, etc.

In order to efficiently integrate a completely equipped floor module of this kind into the fuselage, the interfaces (or connection points) between the module and the fuselage must be connected as quickly as possible, using connection devices. Furthermore, the fixing must be clean and must be able to compensate for any play. Indeed, play generally appears at the various connection points, owing to imperfect geometries and/or to errors in alignment between parts or holes.

There is an advantage to be gained in having available a connection device with which it is possible to realize an assembly that makes it possible to compensate for play, generally of the order of several millimeters, without this requiring adjustment operations or drilling in order to have a clean assembly in the final assembly phase, which can be carried out quickly.

The present invention relates to a connection device intended to connect together two mechanical parts, with which it is possible to establish a connection that is quick, clean and able to effectively compensate for play.

According to the invention, said connection device comprises at least:
  one eccentric pin comprising at least a first cylindrical segment intended to be inserted into a circular hole of a first of said mechanical parts and a second cylindrical segment, said first and second cylindrical segments having different axes of revolution; and
  one eccentric sleeve comprising at least one hollow cylinder provided with an outer cylindrical surface and an inner cylindrical surface, the outer cylindrical surface being intended to be inserted into a circular hole of the second of said mechanical parts and the inner cylindrical surface being intended to receive the second cylindrical segment of the eccentric pin, said inner and outer cylindrical surfaces having different axes of revolution.

Preferably, although not exclusively, said connection device further comprises:
  a first locking element that is able to lock the eccentric pin in rotation; and
  a second locking element that is able to lock the eccentric sleeve in rotation.

Thus, by virtue of the characteristics of double eccentricity due to the eccentric pin and the eccentric sleeve (which is intended to be mounted on the eccentric pin) that cooperate with one another, one has an adjustable tolerance between the first segment of the eccentric pin (which is intended to be inserted into the circular hole of a first of said parts) and the outer cylindrical surface (which is intended to be inserted into the circular hole of the second of said mechanical parts). This tolerance can be adjusted by rotating the eccentric sleeve on the eccentric pin. Thus, suitable rotational positioning of the eccentric sleeve on the eccentric pin makes it possible to compensate for any play between the two (superposed) circular holes of the mechanical parts that are to be connected together. This rotational positioning, once set, is fixed by means of the first and second locking elements.

The connection device thus makes it possible to establish a connection (or assembly) which is able to compensate for possible play, without it being necessary to carry out adjustment operations or drilling, and as a result it is possible to obtain a clean connection and to perform the assembly quickly.

In one preferred embodiment, the first locking element comprises a first plate provided with a circular opening having a notched inner edge, this opening being intended to surround a notched peripheral edge, of complementary shape, of said eccentric pin, said first plate being able to be fixed.

Moreover, in one preferred embodiment, the second locking element comprises a second plate provided with a circular opening having a notched inner edge, this opening being intended to surround a notched peripheral edge, of complementary shape, of said eccentric sleeve, said second plate being able to be fixed.

Advantageously, the first and second cylindrical segments of the eccentric pin are joined directly to one another longitudinally.

Moreover, advantageously, said eccentric pin is provided, at one of its longitudinal ends, with a head and, at the other of its longitudinal ends, with a threaded segment intended to receive a nut.

Moreover, advantageously, the eccentric sleeve comprises an additional segment intended to receive an additional cylindrical segment of the eccentric pin.

The present invention also relates to a mechanical assembly which comprises a first mechanical part, a second mechanical part and a connection device such as that described above, which connects together said first and second mechanical parts.

Advantageously, the first locking element is fixed on the first mechanical part and the second locking element is fixed on the second mechanical part.

The present invention further relates to a method for assembling two mechanical parts, using a connection device such as that described above, said mechanical parts being each provided with at least one circular hole.

According to the invention, said assembly method comprises steps consisting in successively at least:
- bringing the mechanical parts against one another while superposing their circular holes;
- inserting the eccentric pin and the eccentric sleeve into these superposed circular holes and bringing them into a relative rotational position which serves to compensate for any play; and
- locking the eccentric pin and the eccentric sleeve in rotation using the locking elements.

BRIEF DESCRIPTION OF THE FIGURES

The appended figures will make it easy to understand how the invention may be embodied. In these figures, identical references denote similar elements. More particularly.

DETAILED DESCRIPTION

Figure 1:
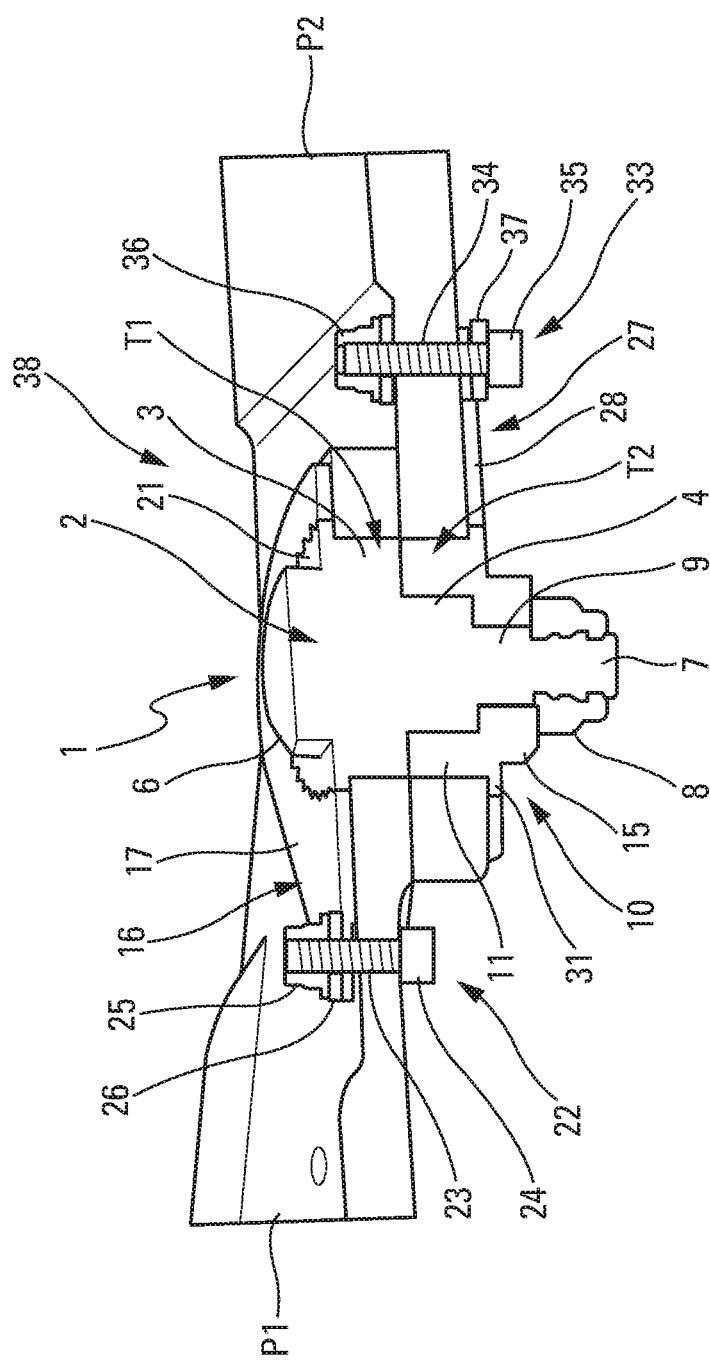
FIG. 1 is a schematic view, in section and slightly in perspective, of a particular embodiment of a connection device connecting together two mechanical parts.

The connection device 1, represented schematically in a particular embodiment in FIG. 1, is intended to establish a connection between two distinct mechanical parts P1 and P2.

Figure 2:
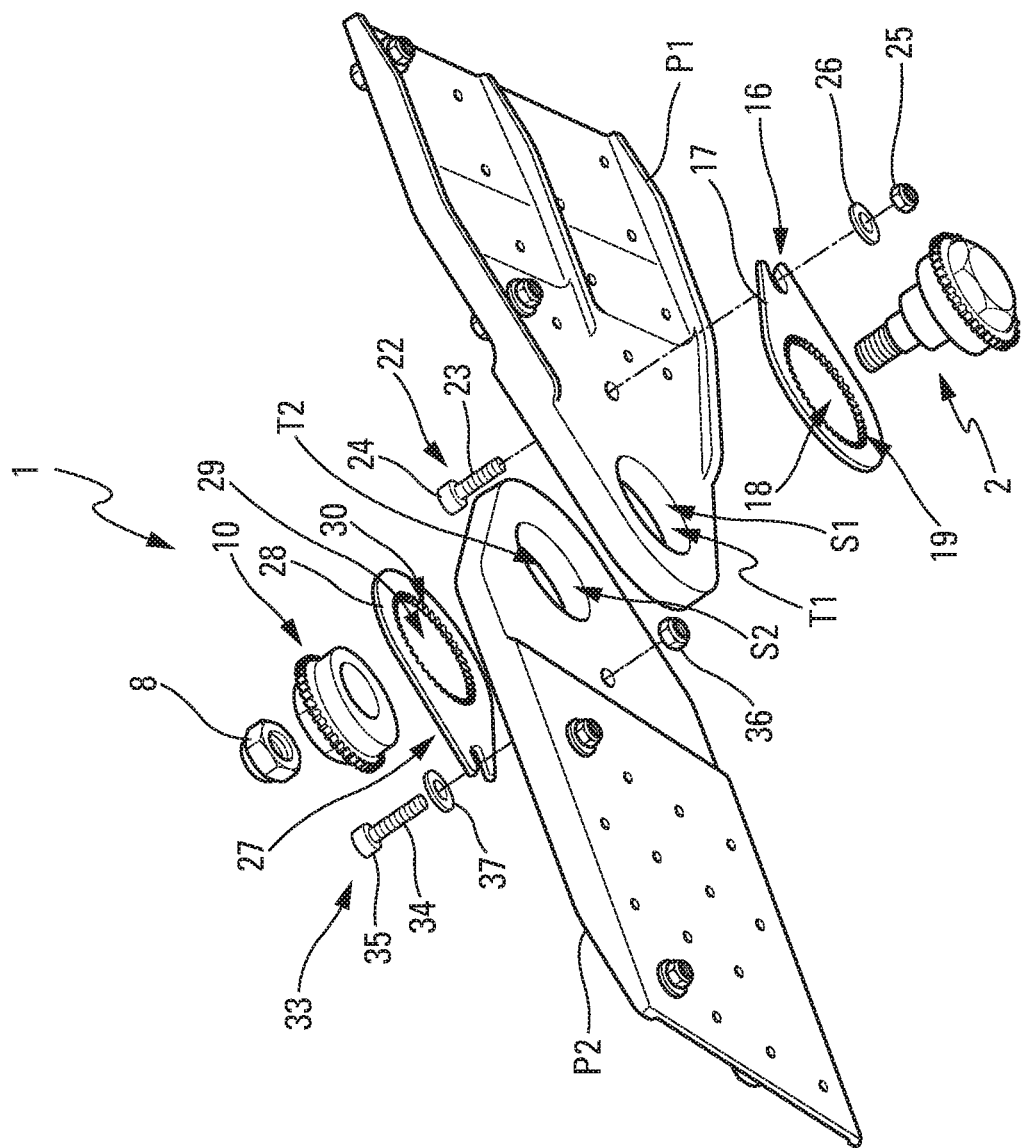
FIG. 2 is an exploded view, in perspective, of two mechanical parts and of the various elements of a connection device intended to connect together these two mechanical parts.

The mechanical parts P1 and P2 are each provided with at least one circular hole T1, T2, as shown in FIG. 2. For assembly, the two mechanical parts P1 and P2 are brought into contact with one another in such a manner as to superpose the circular holes T1 and T2, which are preferably of the same diameter and via the intermediary of which the connection device 1 connects together said mechanical parts P1 and P2.

For that purpose, the connection device 1 comprises, as shown in FIGS. 1 and 2, a solid eccentric pin 2.

Figure 3:
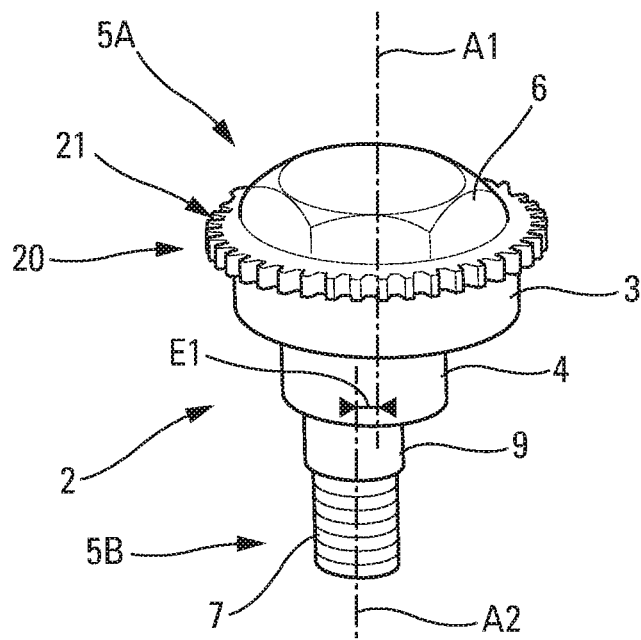
FIG. 3 is a perspective view of an eccentric pin.

The eccentric pin 2 comprises in particular, as shown in FIG. 3:
- a cylindrical portion 3 created in the form of a right circular cylinder having a (central) axis of revolution A1 and
- a cylindrical portion 4 created in the form of a right circular cylinder having a (central) axis of revolution A2.

The cylindrical segments 3 and 4 are joined directly to one another, longitudinally (that is to say in the direction of said axes of revolution A1 and A2).

The pin 2 is said to be eccentric because the two axes of revolution A1 and A2 are different, that is to say not coaxial, while being parallel to one another. In other words, the centers of the circular cross sections of the cylindrical segments 3 and 4 are different, that is to say offset with respect to one another, as shown in FIG. 3 by a separation (or offset) E1 (in a plane orthogonal to said parallel axes of revolution A1 and A2).

The cylindrical segment 3 of the eccentric pin 2 is intended to be inserted into a circular hole of one of said mechanical parts P1 and P2 that are to be connected together, specifically into the circular hole T1 of the mechanical part P1 in the example of FIGS. 1 and 2, being in contact with the inner surface S1 of the circular hole T1.

As shown in FIG. 3, the eccentric pin 2 is provided, at one 5A of its two longitudinal ends 5A, 5B, with a head 6 (for example of the hexagonal type) and, at the other 5B of its two longitudinal ends 5A, 5B, with a threaded segment 7 intended to receive a nut 8 (FIG. 2). The eccentric pin 2 also comprises, between the cylindrical segment 4 and the threaded segment 7, a cylindrical joining segment 9 created in the form of a right circular cylinder (of axis of revolution A2).

Figure 4:
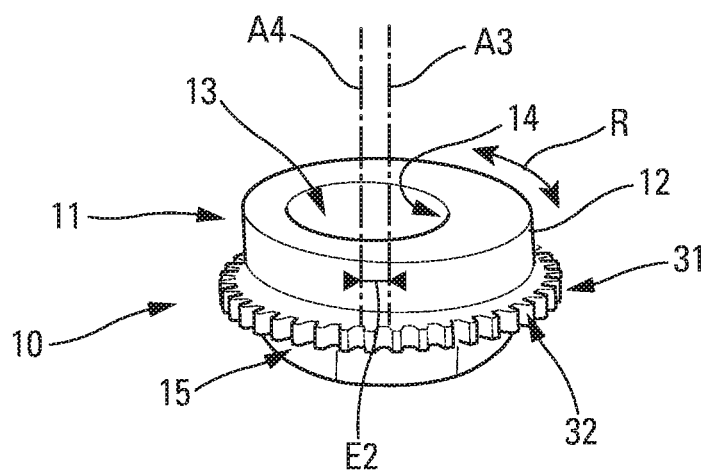
FIG. 4 is a perspective view of an eccentric sleeve.

The connection device 1 further comprises an eccentric sleeve 10. As shown in FIG. 4, the eccentric sleeve 10 is a hollow cylinder. This eccentric sleeve 10 comprises a cylindrical segment 11 provided with a cylindrical outer (or peripheral) surface 12 and a cylindrical inner opening 13. The cylindrical inner opening 13 delimits a cylindrical inner surface 14.

In the context of the present invention, the adjectives "inner" and "outer" are defined, for a cylindrical segment or a cylinder, radially with respect to the (central) axis of revolution of this cylindrical segment or of this cylinder, respectively towards this axis of revolution (for "inner") and away from this axis of revolution (for "outer").

The sleeve 10 is said to be eccentric because the outer cylindrical surface 12 and the inner cylindrical surface 14 have axes of revolution A3 and A4 that are also different, that is to say not coaxial, while being parallel to one another. In other words, the centers of the circular cross sections of the inner and outer cylindrical surfaces 12 and 14 are different, that is to say offset with respect to one another, as shown in FIG. 4 by a separation (or offset) E2 (in a plane orthogonal to said parallel axes of revolution A3 and A4).

The cylindrical segment 11 of the eccentric sleeve 10 is intended to be inserted into a circular hole of the other mechanical part, specifically into the circular hole T2 of the mechanical part P2 in the example of FIGS. 1 and 2, with the outer cylindrical surface 12 in contact with the inner surface S2 of the circular hole T2.

Moreover, the cylindrical inner opening 13 of the eccentric sleeve 10 is intended to receive the cylindrical segment 4 of the eccentric pin 2.

Thus, by virtue of the eccentric pin 2 and the eccentric sleeve 10 (which is intended to be mounted on the eccentric pin 2), one has, on the connection device 1, a double eccentricity, with a separation E1 and a separation E2. This provides an adjustable tolerance between the cylindrical segment 3 of the eccentric pin 2 (which is intended to be inserted into the circular hole T1 of the mechanical part P1) and the cylindrical segment 11 of the outer cylindrical surface 12 of the eccentric sleeve 10 (which is intended to be inserted into the circular hole T2 of the mechanical part P2). This tolerance can be adjusted by rotating the eccentric sleeve 10 in one direction or the other on the eccentric pin 2 (as illustrated by a double arrow R in FIG. 4). Thus, suitable rotational positioning of the eccentric sleeve 10 relative to the eccentric pin 2 makes it possible to compensate for any play between the two (superposed) circular holes T1 and T2 of the mechanical parts P1 and P2 that are to be connected together, and thus lock the mechanical parts P1 and P2 relative to one another, in shear.

The connection device 1 therefore makes it possible to realize a connection (or an assembly) which is able to compensate for any play which may in particular be due to imperfect geometry of the circular holes T1 and T2 and/or to misalignment of these circular holes T1 and T2 when they are superposed, without it being necessary to carry out adjustment operations or drilling, and as a result it is possible to obtain a clean connection and to perform the assembly quickly.

The eccentric sleeve 10 also comprises a segment 15 (FIG. 4) whose inner and outer surfaces have, for example, smaller diameters than those of the inner and outer surfaces of the segment 11 and which is intended to receive the cylindrical segment 9 of the eccentric pin 2, as shown in FIG. 1.

When the appropriate rotational position (between the eccentric sleeve 10 and the eccentric pin 2) is obtained, the assembly is locked in rotation. To that end, the connection device 1 comprises a locking element 16 intended to lock the eccentric pin 2 in rotation.

In one preferred embodiment, and as shown in FIG. 2, the locking element 16 comprises a plate 17. This plate 17 is provided with a circular opening 18 having a notched inner edge 19. Moreover, the eccentric pin 2 comprises a peripheral collar 20 arranged between the cylindrical segment 3 and the head 6, as shown in FIG. 3. This peripheral collar 20 comprises a notched peripheral (or outer) edge 21, the shape of which matches the notched inner edge 19 of the circular opening 18.

For locking, the plate 17 is positioned such that the notched inner edge 19 of the circular opening 18 surrounds the complementarily-shaped notched peripheral edge 21 of the peripheral collar 20 of the eccentric pin 2. Then, the plate 17 is fixed to the mechanical part P1 using conventional fastening means. In the example of FIGS. 1 and 2, the plate 17 is fixed using a bolt 22 comprising a threaded shank 23 provided with a head 24 and a nut 25 that is screwed onto the threaded shank 23. Moreover, a washer 26 is arranged between the head 24 and the plate 17.

In order to lock the eccentric sleeve 10 in rotation with respect to the eccentric pin 2, the connection device 1 also comprises a locking element 27 that is intended to lock the eccentric sleeve 10 in rotation.

In one preferred embodiment, and as shown in FIG. 2, the locking element 27 comprises a plate 28. This plate 28 is provided with a circular opening 29 having a notched inner edge 30. Moreover, the eccentric sleeve 10 comprises a peripheral collar 31 arranged between the segments 11 and 15, as shown in FIG. 4. This peripheral collar 31 comprises a notched peripheral (or outer) edge 32, the shape of which matches the notched inner edge 30 of the circular opening 29.

For locking, the plate 28 is positioned such that the notched inner edge 30 of the circular opening 29 surrounds the complementarily-shaped notched peripheral edge 32 of the peripheral collar 31 of the eccentric sleeve 10. Then, the plate 28 is fixed to the mechanical part P2 using conventional fastening means. In the example of FIGS. 1 and 2, the plate 28 is fixed using a bolt 33 comprising a threaded shank 34 provided with a head 35 and a nut 36 that is screwed onto the threaded shank 34. Moreover, a washer 37 is arranged between the head 35 and the plate 28.

Figure 5:
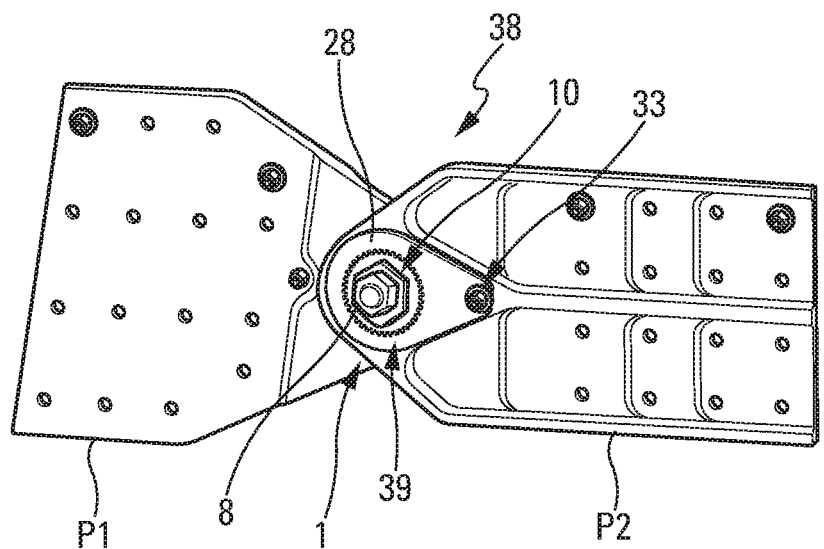
FIGS. 5 and 6 are perspective views of a mechanical assembly comprising two partially superposed mechanical parts and a connection device which connects them together, as seen respectively from one side and from the other of the connection device.
Figure 6:
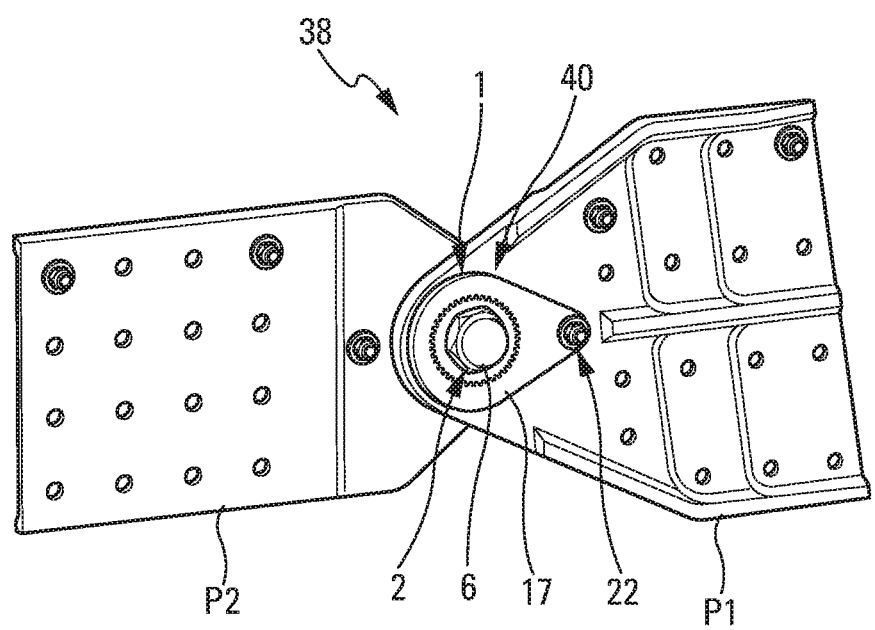

FIGS. 5 and 6 show a mechanical assembly 38 illustrating the connection as realized. This mechanical assembly 38 consists of the mechanical part P1, the mechanical part P2 and the connection device 1 as described above, which connects together these mechanical parts P1 and P2. FIG. 5 shows the view from one side 39 of the mechanical assembly 38, showing in particular the nut 8, and FIG. 6 shows the other side 40 of the mechanical assembly 38, showing in particular the head 6 of the eccentric pin 2.

The connection device 1 is a single shear device, shear being the internal stress state of the mechanical assembly 38, in which each of the mechanical parts P1 and P2, when loaded with opposing forces, tends to slide with respect to the other.

Figure 7:
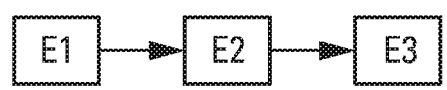
FIG. 7 illustrates schematically the main steps of a method for assembling such a mechanical assembly.

The connection device 1, as described above, is fitted to the two mechanical parts P1 and P2 to form the mechanical assembly 38 of FIGS. 5 and 6, using an assembly method represented in FIG. 7.

This assembly method comprises, in particular, the following steps:
  a step E1 of bringing the mechanical parts P1, P2 against one another while superposing their circular holes T1 and T2;
  a step E2 of inserting the eccentric pin 2 and the eccentric sleeve 10 into these superposed circular holes T1 and T2, the eccentric sleeve 10 surrounding the eccentric pin 2, and bringing them into a relative rotational position which serves to compensate for any play; and
  a step E3 of locking the eccentric pin 2 and the eccentric sleeve 10 in rotation using the locking elements 16, 27, and longitudinally fixing the eccentric pin 2 (and thus also the eccentric sleeve 10) by screwing the nut 8 onto the threaded shank 7 of said eccentric pin 2.

A preferred application of said connection device 1 relates to fixing a module on an aircraft, in particular on a transport airplane, and in particular the attachment of a floor module in the fuselage of the aircraft. To that end, the floor module may be equipped with water pipes, electrical cables, ventilation hoses, floor panels, etc. In that case, the floor module is attached in the fuselage of the aircraft at a plurality of attachment points, of which at least some (and preferably all) use connection devices 1 such as that described hereinabove. To that end, the equipped floor module is moved while being guided by detectors in the fuselage, and is brought to its final position within the fuselage. It is then attached to said fuselage at said plurality of attachment points.

In this application, at each attachment point comprising a mechanical assembly 38, the mechanical part P1 forms part of the fuselage or corresponds to a part attached to said fuselage and the mechanical part P2 forms part of the floor module or corresponds to a part attached to said floor module, or vice versa.

The connection device 1 as described hereinabove has numerous advantages. In particular, it serves to provide:
  a connection that is able to locally compensate for manufacturing and/or alignment tolerances without it being necessary to carry out adjustment operations;
  a rapid connection since the installation of the connection device 1 can be carried out quickly owing to the fact that, in particular, it requires neither adjustment operations nor drilling; and
  a clean connection since no drilling is necessary and the installation of the connection device 1 produces no waste.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A connection device configured to connect together a first mechanical part and a second mechanical part, comprising:
   an eccentric pin comprising a first end including a head, a second end including a threaded segment, a first cylindrical segment between the first and second longitudinal ends and configured to be inserted into a circular hole of the first mechanical part, and a second cylindrical segment between the first cylindrical segment and the second end, said first and second cylindrical segments having different axes of revolution and are fixed together; and
   an eccentric sleeve comprising a hollow cylinder provided with an outer cylindrical surface and an inner cylindrical surface, the outer cylindrical surface configured to be inserted into a circular hole of the second mechanical part, and the inner cylindrical surface configured to receive the second cylindrical segment of the eccentric pin, said inner and outer cylindrical surfaces having different axes of revolution,
   wherein said eccentric sleeve comprises an additional segment configured to receive an additional cylindrical segment of the eccentric pin,
   wherein the additional segment of the eccentric pin has a diameter greater than a diameter of the threaded segment and smaller than diameters of both the first and second cylindrical segments of the eccentric pin, and the additional segment of the eccentric pin is between the second cylindrical segment of the eccentric pin and the threaded segment, and
   wherein the additional segment of the eccentric sleeve includes an inner surface and an outer surface, and a diameter of the inner surface of the additional segment of the eccentric sleeve is smaller than a diameter of the inner cylindrical surface of the hollow cylinder, and a diameter of the outer surface of the additional segment of the eccentric sleeve is smaller than a diameter of the outer cylindrical surface of the hollow cylinder of the eccentric sleeve.

2. The connection device as claimed in claim 1, further comprising:
   a first locking element configured to lock the eccentric pin against rotation; and
   a second locking element configured to lock the eccentric sleeve against rotation.

3. The connection device as claimed in claim 2, wherein the first locking element comprises a first plate including a first circular opening having a notched inner edge, the first opening configured to surround and engage a notched peripheral edge of said eccentric pin.

4. The connection device as claimed in claim 2, wherein the second locking element comprises a second plate including a second circular opening having a notched inner edge, the second opening configured to surround and engage a second notched peripheral edge of said eccentric sleeve.

5. The connection device as claimed in claim 1, wherein the eccentric pin is a single piece including the first and second ends, the first and second cylindrical segments and the additional segment of the eccentric pin.

6. The connection device as claimed in claim 1, wherein the threaded segment of the eccentric pin is configured to receive a nut.

7. A mechanical assembly, comprising:
   the connection device according to claim 1,
   wherein the first and second mechanical parts are connected together by the connection device.

8. The mechanical assembly as claimed in claim 7, wherein
   the connection device includes a first locking element configured to lock the eccentric pin against rotation; and a second locking element configured to lock the eccentric sleeve against rotation; and
   the first locking element is fixed to the first mechanical part and the second locking element is fixed to the second mechanical part.

9. A method for assembling a first mechanical part and a second mechanical part using the connection device according to claim 1, said first and second mechanical parts each provided with at least one circular hole, the method comprising successively:
   bringing the first and second mechanical parts together such that the circular hole of the first mechanical part is aligned with the circular hole of the second mechanical part;
   inserting the eccentric pin into the circular hole of the first mechanical part, and inserting the eccentric sleeve into the circular hole of the second mechanical part; and
   locking the eccentric pin and the eccentric sleeve against rotation using a first locking element fixed to the first mechanical part and engaging the eccentric pin and using a second locking element fixed to the second mechanical part and engaging the eccentric sleeve.

* * * * *